(12) United States Patent
Lin et al.

(10) Patent No.: US 10,304,405 B2
(45) Date of Patent: May 28, 2019

(54) DISPLAY DRIVING METHOD FOR DRIVING DISPLAY SYSTEM AND DISPLAY SYSTEM

(71) Applicants: BOE Technology Group Co., Ltd., Beijing (CN); Beijing BOE Optoelectronics Technology Co., Ltd., Beijing (CN)

(72) Inventors: Lin Lin, Beijing (CN); Jian Sun, Beijing (CN); Wei Sun, Beijing (CN); Rui Xu, Beijing (CN); Dong Chen, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 11 days.

(21) Appl. No.: 15/522,828

(22) PCT Filed: May 11, 2016

(86) PCT No.: PCT/CN2016/081682
§ 371 (c)(1),
(2) Date: Apr. 28, 2017

(87) PCT Pub. No.: WO2017/140046
PCT Pub. Date: Aug. 24, 2017

(65) Prior Publication Data
US 2018/0090092 A1    Mar. 29, 2018

(30) Foreign Application Priority Data

Feb. 17, 2016    (CN) .......................... 2016 1 0089821

(51) Int. Cl.
*G09G 3/36*    (2006.01)
*G06F 3/14*    (2006.01)
*G09G 5/393*   (2006.01)

(52) U.S. Cl.
CPC ............. *G09G 3/3685* (2013.01); *G06F 3/14* (2013.01); *G06F 3/1446* (2013.01);
(Continued)

(58) Field of Classification Search
CPC ............. G09G 3/3685; G09G 2360/04; G09G 3/3611; G06F 3/1446; G06F 3/1431; G06F 3/1423
See application file for complete search history.

(56) References Cited

U.S. PATENT DOCUMENTS 7,136,042 B2 * 11/2006 Magendanz .......... G06F 3/1431
345/100
8,001,455 B2 * 8/2011 Gloege ................ H04N 7/0122
715/202

(Continued)

FOREIGN PATENT DOCUMENTS

| CN | 101409062 A | 4/2009 |
|----|-------------|--------|
| CN | 102855111 A | 1/2013 |
| CN | 103136157 A | 6/2013 |
| CN | 103703503 A | 4/2014 |
| CN | 105549943 A | 5/2016 |
| JP | 2010-156846 A | 7/2010 |

OTHER PUBLICATIONS

International Search Report and Written Opinion, including English translation of Box No. V of the Written Opinion, for International Application No. PCT/CN2016/081682, dated Nov. 30, 2016, 16 pages.

*Primary Examiner* — King Y Poon
*Assistant Examiner* — Vincent Peren
(74) *Attorney, Agent, or Firm* — Westman, Champlin & Koehler, P.A.

(57) ABSTRACT

The embodiments of the present application disclose a display driving method for driving a display system, comprising: receiving K image information sequentially; gener-
(Continued)

ating combined image information according to the K image information; and displaying a combined image based on the combined image information; wherein generating combined image information comprises: receiving $k^{th}$ image information, storing the $k^{th}$ image information as a data matrix with $m_k$ rows and $n_k$ columns, and recording a storage address associated with $n_k^{th}$ data in each row to acquire a $k^{th}$ address table, wherein various rows in the data matrix are stored sequentially by using addresses in a $(k-1)^{th}$ address table as first addresses, where K, $m_k$, $n_k$ are integers greater than 1, and k is an integer greater than or equal to 1 and less than or equal to K; and repeating the above operations until k is equal to K.

14 Claims, 6 Drawing Sheets

(52) U.S. Cl.
CPC ........... *G09G 3/3611* (2013.01); *G09G 5/393* (2013.01); *G09G 2300/026* (2013.01); *G09G 2300/0408* (2013.01); *G09G 2300/0426* (2013.01); *G09G 2340/02* (2013.01); *G09G 2360/04* (2013.01)

(56) References Cited

U.S. PATENT DOCUMENTS

| | | | |
|---|---|---|---|
| 8,217,855 B2 * | 7/2012 | Ku | G06F 3/1431 345/1.1 |
| 8,330,671 B2 | 12/2012 | Ryu | |
| 8,773,327 B2 | 7/2014 | Ryu | |
| 2004/0150581 A1 * | 8/2004 | Westerinen | G06F 1/1601 345/1.3 |
| 2006/0203002 A1 * | 9/2006 | Kuroki | G09G 5/14 345/564 |
| 2007/0120763 A1 * | 5/2007 | De Paepe | G06F 3/03547 345/1.3 |
| 2009/0021532 A1 * | 1/2009 | Gloege | H04N 7/0122 345/647 |
| 2013/0021428 A1 * | 1/2013 | Byers | G06F 3/1446 348/14.07 |
| 2013/0044089 A1 * | 2/2013 | Chang-Chian | G06F 3/1431 345/204 |
| 2013/0127905 A1 | 5/2013 | Zhang et al. | |
| 2014/0063392 A1 | 3/2014 | Gondo | |
| 2016/0196804 A1 * | 7/2016 | Skinner | H04N 19/124 345/543 |

* cited by examiner $$\begin{bmatrix} A11 & A12 & \cdots & A1n \\ A21 & A22 & \cdots & A2n \\ \vdots & \vdots & \ddots & \vdots \\ Am1 & Am2 & \cdots & Amn \end{bmatrix}$$

$$\begin{bmatrix} B11 & B12 & \cdots & B1n \\ B21 & B22 & \cdots & B2n \\ \vdots & \vdots & \ddots & \vdots \\ Bm1 & Bm2 & \cdots & Bmn \end{bmatrix}$$

Fig. 7

DISPLAY DRIVING METHOD FOR DRIVING DISPLAY SYSTEM AND DISPLAY SYSTEM

CROSS-REFERENCE TO RELATED APPLICATION(S)

This application is a Section 371 National Stage Application of International Application No. PCT/CN2016/081682, filed on May 11, 2016, entitled "DISPLAY DRIVING METHOD AND DISPLAY SYSTEM," which claims priority to the Chinese Patent Application No. 201610089821.6, filed on Feb. 17, 2016, incorporated herein by reference in their entirety.

TECHNICAL FIELD

The present application relates to the field of display, and more particularly, to a display driving method and a display system.

BACKGROUND

In the field of conventional display, a driver Integration Circuit (IC) generally corresponds to a Liquid Crystal Display (LCD) display screen. For example, if two letters "I" need to be displayed simultaneously using two respective display screens, when a conventional wiring method is used, a large number of source lines are redundant, which results in a waste of resources.

SUMMARY

Therefore, the present application proposes a display driving method and a display system which uses a Chip on Film (COF) structure to drive a plurality of display screens simultaneously using an LCD driver IC to achieve display control, transmission and processing of different display data.

The embodiments of the present application provide a display driving method and a display system.

According to an aspect of the present application, there is provided a display driving method for driving a display system, comprising:
receiving K image information sequentially;
generating combined image information according to the K image information; and
displaying a combined image based on the combined image information;
wherein generating combined image information according to the K image information comprises:
  receiving $k^{th}$ image information among the K image information, storing the $k^{th}$ image information as a data matrix with $m_k$ rows and $n_k$ columns, and recording a storage address associated with $n_k^{th}$ data in each row to acquire a $k^{th}$ address table for the $k^{th}$ image information, wherein various rows in the data matrix for the $k^{th}$ image information are stored sequentially by using addresses in a $(k-1)^{th}$ address table for $(k-1)^{th}$ image information as first addresses, where K, $m_k$, $n_k$ are integers greater than 1, and k is an integer greater than or equal to 1 and less than or equal to K; and
  repeating the above operations until k is equal to K, so as to acquire the combined image information including a composite data matrix.

In an embodiment, the display system comprises K display screens and a display driving unit having K groups of source lines, wherein the K groups of source lines correspond to the K display screens one by one.

In an embodiment, the K display screens comprise abnormal shaped display screens which are non-rectangular shaped, and of which shapes correspond to the K image information respectively.

In an embodiment, in a case that K is equal to 2, the method comprises:
receiving first image information, and storing a data matrix Aij for a first image information in a storage space, wherein i and j represent a position (i, j) in the data matrix Aij for the first image information;
recording storage addresses of next data of the last data in various rows in the data matrix Aij as FlagA1, FlagA2, . . . FlagAm, so as to construct a first address table including the addresses FlagA1, FlagA2, . . . FlagAm, wherein m is a number of rows in the data matrix Aij; and
receiving second image information, and storing a first row to an $m^{th}$ row in a data matrix Bij for the second image information in order in the storage space based on the addresses FlagA1, FlagA2, . . . FlagAm, so as to acquire the composite data matrix.

In an embodiment, the method further comprises: recording storage addresses FlagB1, FlagB2, . . . FlagBm of next data of the last data in various rows in the data matrix Bij as row compression flags for row compression processing.

In an embodiment, the method further comprises: compressing each row in the composite data matrix; and transmitting the compressed composite data matrix to the display driving unit.

In an embodiment, addresses in a $K^{th}$ address table for $K^{th}$ image information are used as row compression flags.

In an embodiment, when k=1, various rows in the data matrix for the first image information are stored sequentially with predetermined addresses as first addresses.

According to another aspect of the present application, there is provided a display system, comprising:
a display screen;
a display driving unit; and
a control unit, configured to receive K image information sequentially; generate combined image information according to the K image information; and transmit the combined image information to the display driving unit so that the display driving unit displays a combined image based on the combined image information;
wherein the control unit is further configured to:
  receive $k^{th}$ image information among the K image information, store the $k^{th}$ image information as a data matrix with $m_k$ rows and $n_k$ columns, and record a storage address associated with $n_k^{th}$ data in each row to acquire a $k^{th}$ address table for the $k^{th}$ image information, wherein various rows in the data matrix for the $k^{th}$ image information are stored sequentially by using addresses in a $(k-1)^{th}$ address table for $(k-1)^{th}$ image information as first addresses, where K, $m_k$, $n_k$ are integers greater than 1, and k is an integer greater than or equal to 1 and less than or equal to K; and
  repeat the above operations until k is equal to K, so as to acquire the combined image information including a composite data matrix.

In an embodiment, the system comprises K display screens and the display driving unit comprises K groups of source lines, wherein the K groups of source lines correspond to the K display screens one by one.

In an embodiment, the K display screens comprise abnormal shaped display screens which are non-rectangular shaped, and of which shapes correspond to the K image information respectively.

In an embodiment, in a case that K is equal to 2, the control unit is configured to:

receive first image information, and store a data matrix Aij for a first image information in a storage space, wherein i and j represent a position (i, j) in the data matrix Aij for the first image information;

record storage addresses of next data of the last data in various rows in the data matrix Aij as FlagA1, FlagA2, . . . FlagAm, so as to construct a first address table including the addresses FlagA1, FlagA2, . . . FlagAm, wherein m is a number of rows in the data matrix Aij; and receive second image information, and store a first row to an $m^{th}$ row in a data matrix Bij for the second image information in order in the storage space based on the addresses FlagA1, FlagA2, . . . FlagAm, so as to acquire the composite data matrix.

In an embodiment, the control unit is further configured to: record storage addresses FlagB1, FlagB2, . . . FlagBm of next data of the last data in various rows in the data matrix Bij as row compression flags for row compression processing.

In an embodiment, the control unit is configured to: compress each row in the composite data matrix; and transmit the compressed composite data matrix to the display driving unit.

In an embodiment, addresses in a $K^{th}$ address table for $K^{th}$ image information are used as row compression flags.

In an embodiment, when k=1, various rows in the data matrix for the first image information are stored sequentially with predetermined addresses as first addresses.

BRIEF DESCRIPTION OF THE DRAWINGS

FIG. 7 illustrates a diagram of a matrix for representing two images; and

DETAILED DESCRIPTION

In order to make the purpose, technical solutions, and advantages of the present application more clear and obvious, the embodiments of the present application will be further described in detail below in conjunction with specific embodiments and with reference to accompanying drawings. Obviously, the embodiments as described are merely a part of the embodiments of the present application instead of all the embodiments. All other embodiments acquired by the skilled persons in the art based on the embodiments of the present application without contributing any creative labor should belong to the scope protected by the present application.

Figure 1:
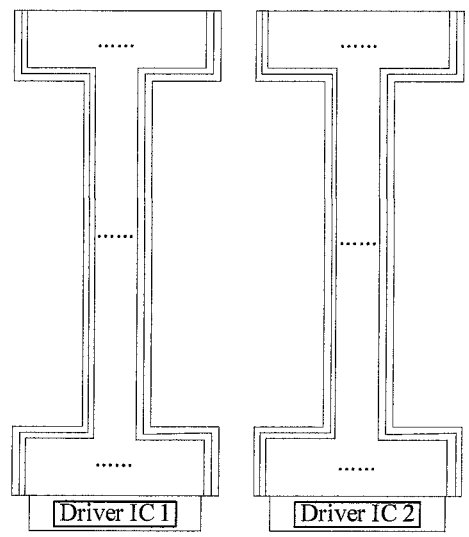
FIG. 1 illustrates a diagram of wiring of a display screen and a driver IC in display of a conventional multi-display screen.
Figure 2:
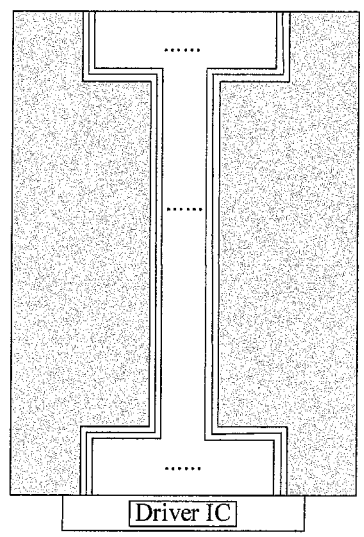
FIG. 2 illustrates a diagram of display of a conventional multi-display screen when a letter "I" is displayed.

In a field of conventional abnormal shaped display screens, design of a structure of an abnormal shaped display screen depends on a structure of a normal shaped display screen, and it may be simply understood that the abnormal shaped display screen is realized by cutting the normal shaped display screen. That is, the abnormal shaped display screen may be a part of the corresponding normal shaped display screen. Compared to the normal shaped display screen, the abnormal shaped display screen has a reduced size, a reduced display image, and a decreased amount of transmitted data, and as a result, a number of source lines required by the abnormal shaped display screen is also reduced. By taking display of a letter "I" as an example, FIG. 2 illustrates a diagram of display of the letter "I" on a conventional 5-inch standard display screen in which a rectangular area is a regular display screen corresponding to "I", and a gray area is a cut part of the display screen which is not used, i.e., there is no need to provide source line driving signals required by the gray area. When an LCD driver IC of the 5-inch standard display screen is used to drive the abnormal shaped display screen "I", there is no data on source lines for the gray area. Therefore, when letters "I" are displayed on the two display screens respectively using the conventional wiring method as shown in FIG. 1, the source lines for the gray area shown in FIG. 2 are idle. This problem is overcome by the technical solutions according to the embodiments of the present application.

Thereafter, the display system and the display driving method according to the embodiments of the present application will be described in detail with reference to FIGS. 3 to 8.

Figure 3:
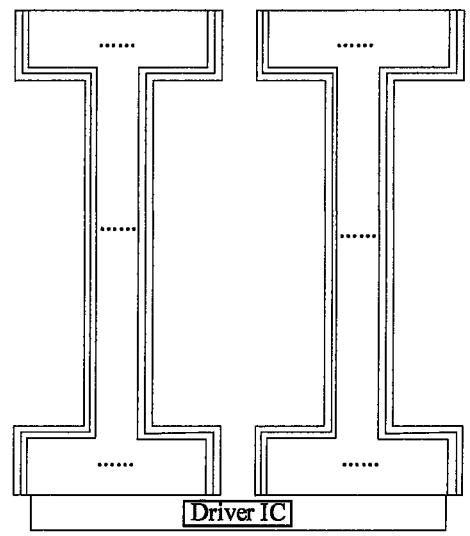
FIG. 3 illustrates a diagram of wiring of a display screen and a driver IC in display of a multi-display screen according to an embodiment of the present application.

FIG. 3 illustrates a diagram of wiring of a display screen and a driver IC in a display structure of a multi-display screen according to an embodiment of the present application. The present application will be described by taking display of two letters "I" using an abnormal shaped display screen as an example. When the letters "I" are displayed on two display screens respectively, a single LCD driver IC is used to drive the two display screens simultaneously. It will be understood by those skilled in the art that an abnormal shaped display screen may be used for display, although the present application is not limited thereto. According to an embodiment of the present application, source lines of the LCD driver IC are grouped, wherein a left half group of source lines corresponds to an area of a driver IC 1 in FIG. 1, and a right half group of source lines corresponds to an area of a driver IC 2 in FIG. 1. When the two letters are composited into an image for display, an algorithm used for design of this circuit structure is the same as an algorithm for displaying an image when a single conventional display screen is driven by a single LCD driver IC. As a result, there is no need to modify a timing logic, output control, data processing and transmission. If the conventional structure shown in FIG. 1 in which one driver IC corresponds to one LCD display screen is used, when the two letters "I" are displayed as an image, it needs to divide the image into left and right parts, and image data of both parts of the image is compressed row by row, and is then transmitted to the driver IC 1 and the driver IC 2 respectively. In this case, processing of timing scheduling, output control and image compression need to be re-designed by IC manufacturers and underlying firmware files need to be updated.

Figure 4:
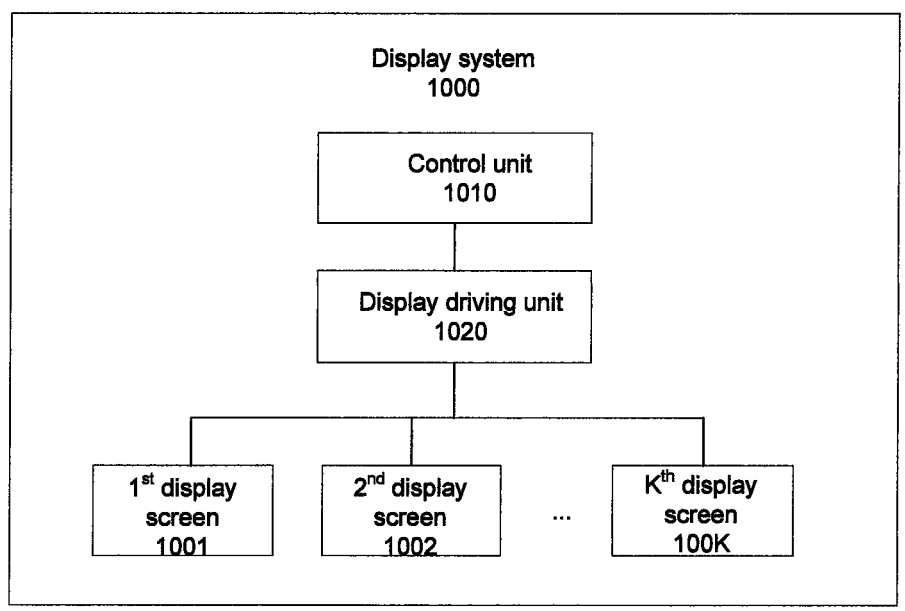
FIG. 4 illustrates a block diagram of a display system according to an embodiment of the present application.

According to an embodiment of the present application, there is provided a display system 1000, as shown in FIG. 4, comprising a control unit 1010, a display driving unit 1020, and a plurality of display screens 1001 to 100K, wherein K is an integer greater than 1. The display driving unit 1020 comprises K groups of source lines, which correspond to the K display screens one by one. The control unit 1010 is configured to receive K image information sequentially, generate combined image information according to the K image information, and transmit the combined image information to the display driving unit so that the display driving unit achieves display of a combined image based on the combined image information. Each group of source lines drives a corresponding display screen to display a corresponding part of the combined image.

Figure 5:
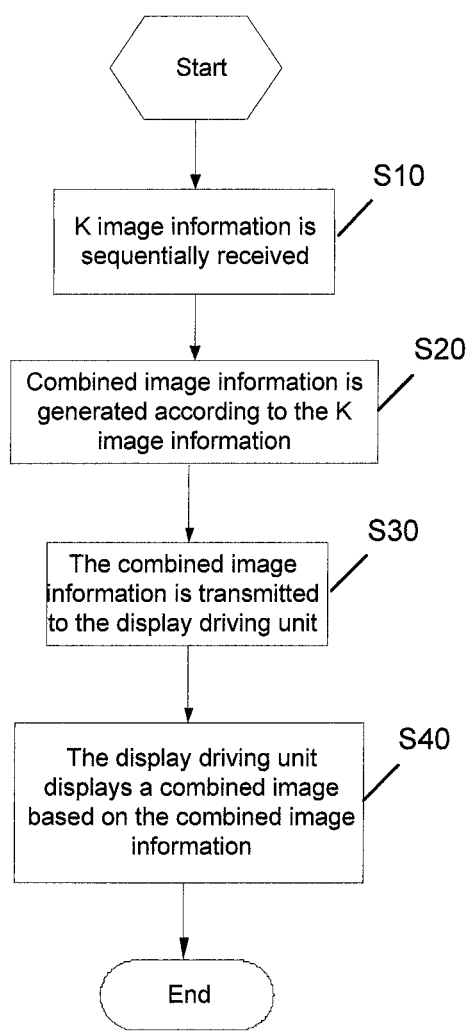
FIG. 5 illustrates a flowchart of a display driving method according to an embodiment of the present application.

As shown in FIG. 5, there is provided a display driving method for driving a display system including K display screens and a display driving unit having K groups of source lines, wherein the K groups of source lines correspond to the K display screens one by one, and K is an integer greater than 1. In step S10, K image information is sequentially received. In step S20, combined image information is generated according to the K image information. In step S30, the combined image information is transmitted to the display driving unit. In step S40, the display driving unit achieves display of a combined image based on the combined image information. In an embodiment, each group of source lines drives a corresponding display screen to display a corresponding part of the combined image.

Figure 6:
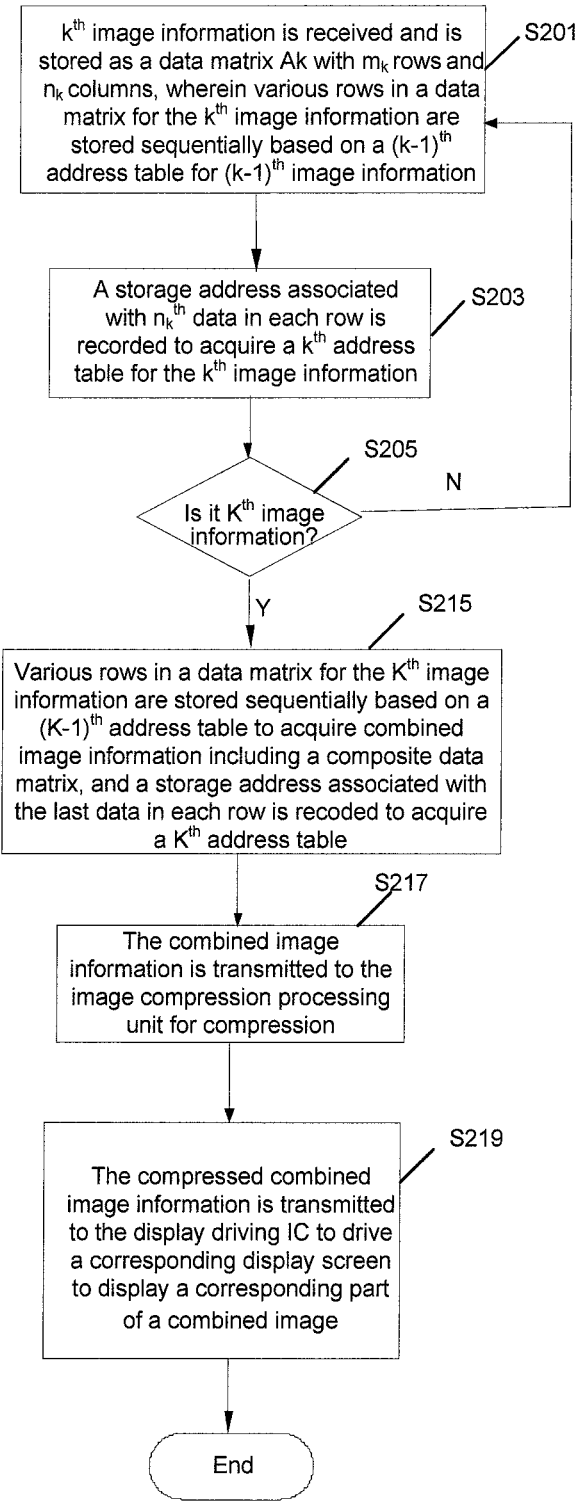
FIG. 6 illustrates a flowchart of an image composition method according to an embodiment of the present application.

Next, an image composition method according to an embodiment of the present application will be described in detail. As shown in FIG. 6, in step S201, $k^{th}$ received image information is stored as a data matrix with $m_k$ rows and $n_k$ columns. Here, $m_k$ and $n_k$ are integers greater than 1, and k is an integer greater than or equal to 1 and less than K. When k=1, first image information may be stored at a predetermined address, for example, an initial address of a storage space. When k is greater than 1, various rows of a data matrix for $k^{th}$ image information are stored sequentially based on addresses in a $(k-1)^{th}$ address table for $(k-1)^{th}$ image information. Of course, the present disclosure is not limited thereto, and the first image information may be stored in any position in the storage space as long as there is a sufficient space to ensure storage of subsequent image information.

In step S203, a storage address associated with $n_k^{th}$ data in each row is recorded to acquire a $k^{th}$ address table for the $k^{th}$ image information, and k=k+1. For example, the storage address associated with the $n_k^{th}$ data in each row may be a storage address of the $n_k^{th}$ data in each row+1.

In step S205, it is judged whether the last image information is received, that is, whether $K^{th}$ image information is received.

If the $K^{th}$ image information isn't received, steps S201 and S203 are repeated until k is equal to K.

If the $K^{th}$ image information is received, step S215 is performed. In step S215, various rows for the $K^{th}$ image information are stored sequentially based on addresses in a $(K-1)^{th}$ address table for $(K-1)^{th}$ image information. For example, various rows for the $K^{th}$ image information may be stored sequentially by using the addresses in the $(K-1)^{th}$ address table as first addresses; and a memory address associated with the last data of each row is recorded to acquire a $K^{th}$ address table and the combined image information including the composite data matrix. Then, step S217 is performed.

In step S217, the control unit performs data compression processing on the composite data matrix. Data of the composite data matrix may be compressed in units of rows, wherein data in the $K^{th}$ address table may be used as a flag for the end of each row in the composite data matrix. Then, step S219 is performed.

In step S219, the compressed combined image information is transmitted to the display driving unit to drive a corresponding one of the K display screens to display a corresponding part of a combined image according to the combined image information.

Figure 8:
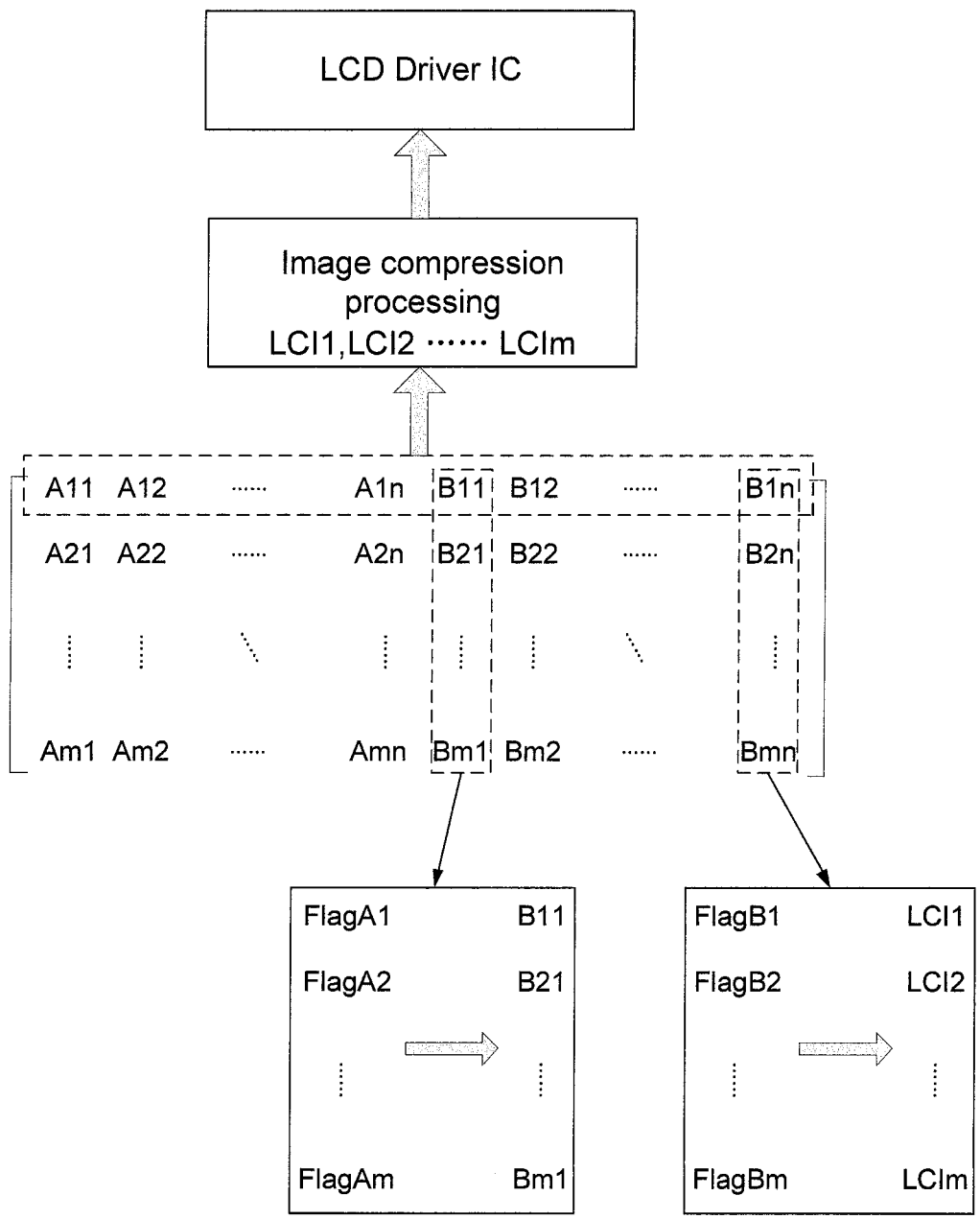
FIG. 8 illustrates a diagram of an image composition matrix according to an embodiment of the present application.

Specifically, by taking display of two letters "I" as two independent images respectively as an example, the control unit receives two image information in order. As shown in FIG. 7, the two image information is two image information matrices which are consecutive in time and have m rows and n columns. The control unit splices the two image information matrices into an image information matrix as shown in FIG. 8, and after the splicing is completed, the image information matrix is compressed and transmitted to the LCD driver IC and two "I"-shaped display screens for display. The control unit may perform data compression while receiving the image information, and transmit the compressed image data in order to the LCD driver IC, which then transmits the compressed image data to a corresponding display for display according to requirements for timing of the display.

In the control unit or a corresponding storage space thereof, a matrix space with a width or depth of 2n is created. A data matrix Aij for the first image information is normally placed, wherein i and j represent a position (i, j) in the data matrix Aij for the first image information, where 1≤i≤m and 1≤j≤n. A storage address of next data of the last data in each row for the first image is expressed as FlagAi, and each {Flag/Ai} is recorded to construct a first address table including addresses FlagA1 to FlagAm, which are first addresses for various rows of information in a data matrix for second image information. After the first image information is completely processed, the data matrix Bij for the second image information is received, and a first row of data {B11, B12 . . . B1n} to an $m^{th}$ row of data {Bm1, Bm2 . . . Bmn} in the data matrix Bij start to be stored in order in the storage space based on the addresses FlagA1 to FlagAm in the first address table. Similarly, a storage address of next data of the last data in each row in the data matrix Bij is expressed as FlagBi, and each {FlagBi} is recorded to construct a second address table including addresses FlagB1 to FlagBm. For example, after the first image information is completely processed, the data matrix Bij for the second image information is received, the address FlagA1 in the first address table is acquired, and the first row of data {B11, B12 . . . B1n} starts to be stored. FlagB1 appears at the end of the first row, which indicates that a first row in the composite image matrix is completely constructed, and this row of data is transmitted to the image compression processing unit to compress the first row in the composite image matrix. At the same time, an address FlagA2 in the first address table is acquired, and a second row of data {B21, B22, . . . , B2n} in the data matrix Bij for the second image information is stored, and so on, until FlagBm is detected, which indicates that the composition of the entire image is completed, and the last row in the composite image matrix starts to be compressed. Thus, {FlagBi} is implemented as a row compression flag matrix {LCli}. When this signal is detected, the image compression processing unit starts to read and compress a row of data. After the compression is completed, the image compression processing unit transmits the row of compressed data to the LCD Driver IC while releasing the storage spaces A11, A12 . . . B1n occupied by the first row in the composite image matrix.

According to the above example, the introduction of the first address table and the second address table increases the flexibility of the design since as long as various rows of the data matrix for the second image information are correctly stored in order after various corresponding rows of the data matrix for the first image information, various rows of the composite matrix can be correctly and effectively constructed and can be transmitted to the image compression processing unit to complete the row compression operation. Due to the presence of the address tables, various rows of the data matrix for the first image information can make full use of any scattered storage spaces, and can be stored horizontally or vertically, as long as a width or depth of the storage spaces satisfies the requirements for a number of columns in the composite matrix.

According to the technical solutions of the embodiments of the present application, the flag information {FlagAi} in the data matrix for the first image information may be multiplexed. In addition to indicating the end of the data matrix for the first image information, the addresses FlagA1, FlagA2 . . . FlagAm may also be used to provide first addresses for various rows of image information in the data matrix for the second image information, which ensures that various rows in the data matrix for the second image information can be placed correctly.

According to the technical solutions of the embodiments of the present application, the flag information {FlagBi} in the data matrix for the second image information may be multiplexed. In addition to indicating the end of the data matrix for the second image information, the addresses FlagB1, FlagB2 . . . FlagBm may also be multiplexed as a row compression flag matrix {LCli} for triggering the image compression processing unit to read corresponding rows in the composite image matrix and start to compress the rows. At the same time, FlagBm indicates that the composition of the entire image is completed, the last row of data in the composite image matrix starts to be compressed.

It should be noted here that the above example is described in a case that a size of the first image information is the same as that of the second image information. It will be understood by those skilled in the art that according to the embodiments of the present application, a size of a data matrix for a $(k-1)^{th}$ image information may be the same as or different from a size of a data matrix for $k^{th}$ image information, for example, a number of rows in the data matrix for the $(k-1)^{th}$ image information may be equal to or may not be equal to a number of rows in the data matrix for the $k^{th}$ image information. In a case that the number of the rows in the data matrix for the $(k-1)^{th}$ image information is equal to the number of the rows in the data matrix for the $k^{th}$ image information, it means that a number $m_{k-1}$ of addresses in a $(k-1)^{th}$ address table is equal to the number $m_k$ of the rows in the data matrix for the $k^{th}$ image information, and then various rows in the data matrix for the $k^{th}$ image information are stored in order by using various addresses in the $(k-1)^{th}$ address table as first addresses. In a case that the number $m_{k-1}$ of the rows in the data matrix for the $(k-1)^{th}$ image information is less than the number $m_k$ of rows in the data matrix for the $k^{th}$ image information, it means that the number $m_{k-1}$ of the addresses in the $(k-1)^{th}$ address table is less than the number $m_k$ of the rows in the data matrix for the $k^{th}$ image information, and then the number $m_{k-1}$ of rows in the data matrix for the $k^{th}$ image information are stored in order by using various addresses in the $(k-1)^{th}$ address table as first addresses, and remaining rows in the data matrix for the $k^{th}$ image information are stored by using for example the last address in the $(k-1)^{th}$ address table as a first address.

Of course, other storage solutions may also be used in the present disclosure, as long as there is an enough storage space in the display system. In a case that the number $m_{k-1}$ of the rows in the data matrix for the $(k-1)^{th}$ image information is greater than the number $m_k$ of the rows in the data matrix for the $k^{th}$ image information, it means that the number $m_{k-1}$ of the addresses in the $(k-1)^{th}$ address table is greater than the number $m_k$ of the rows in the data matrix for the $k^{th}$ image information, and then the number $m_k$ of rows in the data matrix for the $k^{th}$ image information are stored in order by using first $m_k$ addresses in the $(k-1)^{th}$ address table as first addresses.

In addition, it can be understood by those skilled in the art that the display screen according to the present disclosure may be a liquid crystal display screen, and of course, it may also be any other type of display screen. The present disclosure is not limited thereto.

According to the technical solutions of the embodiments of the present application, when image composition is performed for display of an image by using a plurality of display screens, a used algorithm is the same as the algorithm for displaying an image by driving a conventional display screen with a single LCD driver IC, there is no need to modify a timing logic, output control, data processing and transmission, and underlying firmware files need not to be re-designed and updated by IC manufacturers. In addition, when a plurality of display screens are used to display different images respectively, each LCD driver IC corresponds to a plurality of display screens with a COF structure, and the plurality of display screens are driven by the single LCD driver IC, which avoids redundancy of source lines due to the conventional driving structure in which a single driver IC corresponds to a single display screen. Due to the full use of output of the source lines of the LCD driver IC, the waste of resources is reduced. This application is particularly applicable to a field of abnormal shaped displays.

The above specific embodiments further describe the purposes, technical solutions and beneficial effects of the present application in detail. It should be understood that the above description is merely specific embodiments of the present application, instead of limiting the present application. Any modification, equivalent substitution, improvement etc., made within the spirit and principle of the present application, should be included in the protection scope of the present application.

We claim:

1. A display driving method for driving a display system, comprising:
   receiving K image information sequentially;
   generating combined image information according to the K image information; and
   displaying a combined image based on the combined image information;
   wherein generating combined image information according to the K image information comprises:
      receiving $k^{th}$ image information among the K image information, storing the $k^{th}$ image information as a data matrix with $m_k$ rows and $n_k$ columns, and recording a storage address associated with $n_k^{th}$ data in each row to acquire a $k^{th}$ address table for the $k^{th}$ image information, wherein each row in the data matrix for the $k^{th}$ image information are stored sequentially by using a corresponding address in a $(k-1)^{th}$ address table for $(k-1)^{th}$ image information as a first address, where K, $m_k$, $n_k$ are integers greater than 1, and k is an integer greater than or equal to 1 and less than or equal to K; and repeating the above operations until k is equal to K, so as to acquire the combined image information including a composite data matrix, wherein the display system comprises K display screens and a display driving unit having K groups of source lines, wherein the K groups of source lines correspond to the K display screens one by one.

2. The method according to claim 1, wherein the K display screens comprise abnormal shaped display screens which are non-rectangular shaped, and a shape of each of the K display screens correspond to each of the K image information respectively.

3. The method according to claim 2, wherein in a case that K is equal to 2, the method comprises:
receiving first image information, and storing a data matrix Aij for the first image information in a storage space, wherein i and j represent a position (i, j) in the data matrix Aij for the first image information;
recording storage addresses of next data of the last data in each row in the data matrix Aij as FlagA1, FlagA2 . . . FlagAm, so as to construct a first address table including the addresses FlagA1, FlagA2, . . . FlagAm, wherein m is a number of rows in the data matrix Aij; and
receiving second image information, and storing a first row to an $m^{th}$ row in a data matrix Bij for the second image information in order in the storage space based on the addresses FlagA1, FlagA2, . . . FlagAm, so as to acquire the composite data matrix.

4. The method according to claim 2, further comprising: recording storage addresses FlagB1, FlagB2, . . . FlagBm of next data of the last data in each row in the data matrix Bij as row compression flags for row compression processing.

5. The method according to claim 1, further comprising: compressing each row in the composite data matrix; and
transmitting the compressed composite data matrix to the display driving unit.

6. The method according to claim 5, wherein addresses in a $K^{th}$ address table for $K^{th}$ image information are used as row compression flags.

7. The method according to claim 1, wherein when k=1, each row in the data matrix for a first of the sequentially received K image information is stored sequentially with a corresponding predetermined address a first address for that row.

8. A display system, comprising:
a display screen;
a display driving unit; and
a control unit, configured to receive K image information sequentially; generate combined image information according to the K image information; and transmit the combined image information to the display driving unit so that the display driving unit displays a combined image based on the combined image information;
wherein the control unit is further configured to:
receive $k^{th}$ image information among the K image information, store the $k^{th}$ image information as a data matrix with $m_k$ rows and $n_k$ columns, and record a storage address associated with $n_k^{th}$ data in each row to acquire a $k^{th}$ address table for the $k^{th}$ image information, wherein each row in the data matrix for the $k^{th}$ image information is stored sequentially by using a corresponding address in a $(k-1)^{th}$ address table for $(k-1)^{th}$ image information as a first address, where K, $m_k$, $n_k$ are integers greater than 1, and k is an integer greater than or equal to 1 and less than or equal to K; and
repeat the above operations until k is equal to K, so as to acquire the combined image information including a composite data matrix,
the system comprises K display screens and the display driving unit comprises K groups of source lines, wherein the K groups of source lines correspond to the K display screens one by one.

9. The system according to claim 8, wherein the K display screens comprises abnormal shaped display screens which are non-rectangular, and a shape of each of the K display screens correspond to the K image information respectively.

10. The system according to claim 9, wherein in a case that K is equal to 2, the control unit is configured to:
receive first image information, and store a data matrix Aij for the first image information in a storage space, wherein i and j represent a position (i, j) in the data matrix Aij for the first image information;
record storage addresses of next data of the last data in each row in the data matrix Aij as FlagA1, FlagA2, . . . FlagAm, so as to construct a first address table including the addresses FlagA1, FlagA2, . . . FlagAm, wherein m is a number of rows in the data matrix Aij; and
receive second image information, and store a first row to an $m^{th}$ row in a data matrix Bij for the second image information in order in the storage space based on the addresses FlagA1, FlagA2, . . . FlagAm, so as to acquire the composite data matrix.

11. The system according to claim 10, wherein the control unit is further configured to: record storage addresses FlagB1, FlagB2, . . . FlagBm of next data of the last data in each row in the data matrix Bij as row compression flags for row compression processing.

12. The system according to claim 8, wherein the control unit is configured to:
compress each row in the composite data matrix; and
transmit the compressed composite data matrix to the display driving unit.

13. The system according to claim 12, wherein addresses in a $K^{th}$ address table for $K^{th}$ image information are used as row compression flags.

14. The system according to claim 8, wherein when k=1, each row in the data matrix for a first of the sequentially received K image information is stored sequentially with a corresponding predetermined address as a first address for that row.

* * * * *